UNITED STATES PATENT OFFICE.

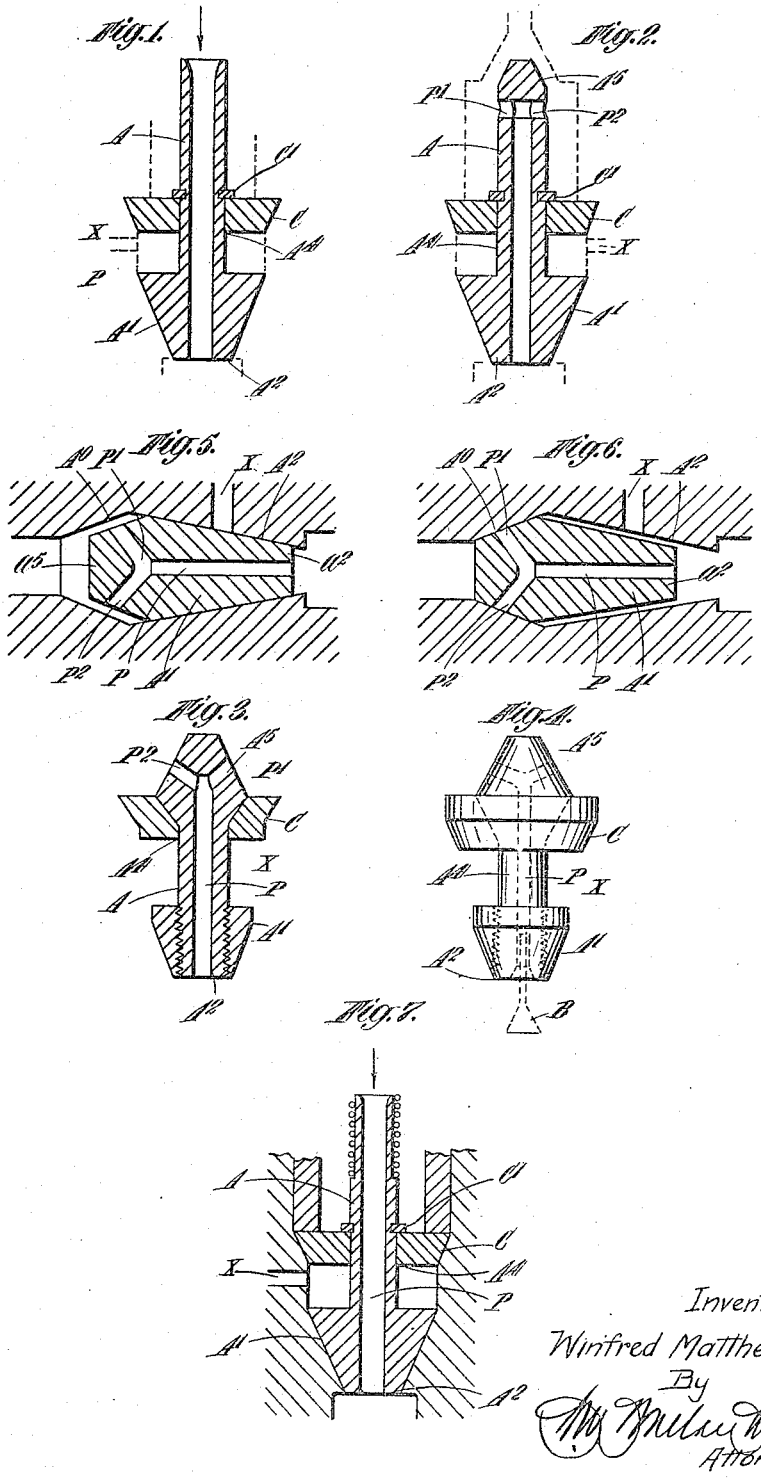

WINFRED MATTHEWMAN, OF INGLETON, ENGLAND.

VALVE AND THE LIKE.

1,222,316.   Specification of Letters Patent.   Patented Apr. 10, 1917.

Application filed June 24, 1916. Serial No. 105,555.

*To all whom it may concern:*

Be it known that I, WINFRED MATTHEWMAN, of Morrgarth Cottage, Ingleton, in the county of York, England, have invented certain new and useful Improvements in and Relating to Valves and the like, of which the following is a specification.

This invention relates to valves and the like having a passage or passages through the valve member, and having in conjunction with the valve member a number of seats capable of covering side and end ports, adapted to isolate side ports when acted on by inlet pressure, and allow incoming fluid to pass through a passage in the interior of the member.

It is the object of the present invention to provide a valve of the above-mentioned kind controlled entirely by pressure or suction and in some cases assisted or acted by a spring, and adapted when isolating side or end ports to make a tight fit against a seating or a portion of the body as distinguished from a sliding fit such as is usually the case with side ports in the constructions hitherto adopted.

According to the present invention I provide a valve comprising a member adapted when acted on by inlet pressure to close against a lower or inner seat and allow incoming air and like to pass through a passage or passages formed in the interior of the member, such closing motion isolating a side port. Modified constructions may be so arranged that when the inlet pressure ceases the valve will rise and allow air or like to pass to the otherwise isolated side port; the valve member may consist of a barrel working in a collar and said collar having a bore hole of a less area than that of the exposed lower end of the valve member.

In the complete specification of my prior British Patent No. 5831 of 1915 I have shown and described a pressure indicating gage fitted with valves having a passage or passages therethrough and generally speaking the valves in the present specification are of the same type, but may be used for any purpose where such type of valves may be required. Some of the valves under consideration are arranged and constructed in such wise that they will lift at what I term a "dead pressure." By such term I mean a still pressure equal at both ends of the valve, but on account of the said constructions hereinafter referred to there is, when the valve is subjected to "dead pressure," a greater pressure on the underside of the improved valve than on that part of the valve which works in what I term a collar, and this allows the lower part of the valve to lift off its seating and let air escape through a port which is isolated during the admission of air or the like.

I may use the valve with or without a small valve working in the lower or delivery end of the internal passage.

In describing my invention in detail reference is made to the accompanying sheet of drawings, similar letters indicating similar parts therein.

Figure 1 shows a sectional elevation of one form of valve.

Figs. 2 and 3 show sectional elevations of modified forms of valves.

Fig. 4 shows an elevation of a further slightly modified form.

Figs. 5 and 6 show a modified form of the valve which does not operate when there is an equal pressure on each side of it.

Fig. 7 shows another modification of a valve similar to Fig. 1, which will lift against a spring and an equal or greater pressure per square inch of air or the like.

In order to carry my improvement into effect I provide a barrel A of suitable material and configuration having an internal hole or passage or passages such as P therethrough, and at one end I provide a valve member A', the lower end of this portion of the valve being greater in area than the bore hole in the collar C at $A^4$ which the valve barrel passes through.

When inlet pressure is admitted to the device the valve will be moved on to its lower seat whereby a port or ports between the collar C and end A' of the valve is or are isolated. The ports are not shown in detail, the position being merely indicated by the letter X. A rubber or like ring C' in this form may be provided to prevent the passage of air between the barrel and the seating collar C and is of such external diameter that the effective area of the exposed surface of the movable valve member at the inlet side of the collar C is less than the area of the flat outlet end face $A^2$ of the valve.

Owing to this difference in area, immediately the inlet pressure is reduced, the valve will move from its lower seating, that is, lift and allow air or the like to pass back to the port at X, which is uncovered by such lift, and so that when the valve is used with a pump it will open after every stroke of the pump, or when the action ceases if a continuous current pump is used.

The valve will be seated in any suitable body and a pump or like connection may be made to same.

The ring C' will prevent any leakage from the outside to the inside of the collar C. The only passage for incoming air or like being through the passage P.

In Fig. 2 I have shown a similar type of valve except that the passage P is not direct through the valve body but terminates in apertures P¹ P² beneath the head A⁵ of the valve.

In Fig. 3 the seating member A' is screwed or otherwise secured on the barrel A, and the ring C is provided with a seating member to engage a seat on the head A⁵ of the valve.

In Fig. 4 I have shown an elevation of a similar valve to that shown in Fig. 3 with a small valve B adapted to work in the passage P on the lower or seating end A'. This valve may be used or not as desired with any of the forms shown.

Where inclined or straight apertures such as P¹ and P² are employed the head A⁵ of the valve may operate in a seating on the valve body as to be closed when the valve lifts.

In the modified construction shown in Figs. 5 and 6, the valve is in one piece with oppositely coned ends $a^2$ $a^5$ and slides in relation to oppositely coned seats A⁰ A². P P¹ P² are the air passages through the valve body as before. X is the isolated port which it will be seen from Fig. 5 is closed by the coned end $a^2$ when pressure is put on by the pump, the air passing through by the passage P P¹ P²; when the pressure ceases and suction action of the pump begins the valve body moves back to the position shown in Fig. 6 opening the isolated port X and acting as a non-return valve by closing the port P¹ P² against the seating A⁰.

Fig. 7 shows a valve similar to Fig. 1 having the inner exposed end greater, for example, say double the size of the hole in collar C and having a spring W pressing at the upper or outer end of the barrel at the rate of 20 lbs. per square inch. Assuming there is an air pressure of 40 lbs. per square inch at the inner or larger end of the valve and also the same air pressure at the other end, but owing to the construction there is only half the pressure exerted on the valve at the outer end, viz: 20 lbs., there is then 40 lbs. air pressure at the inner end of the valve as against 20 lbs. air and 20 lbs. spring pressure at the outer end, and if more is admitted the valve will lift against the spring. It will be seen that the valve will lift if the pressure further increases even if a continuous current of air is admitted of a greater pressure per square inch than the pressure already at the inner or larger end of the valve, supposing there is now 42 lbs. air pressure at the inner end then there is 41 lbs. combined air and spring pressure on the outer end, and if an air pressure of 43 lbs. is admitted to the outer end this is not sufficient to hold down the valve as only half its force is exerted on the outer end, viz: 21½ lbs. which with the 20 lbs. spring pressure is 41½ lbs. against a steady air pressure at the inner end of 42 lbs. The pressures and sizes mentioned are only given by way of example.

What I claim and desire to secure by Letters Patent is:—

1. A check valve comprising a casing having an inlet and an outlet and provided with an intermediate valve seat, and a movable valve member having a seating face for contact with the said seat and provided with a passage adapted to establish communication between the outlet and inlet, the effective surface area of the valve member which is exposed at the outlet side of the said seat when the valve member is seated being greater than the like surface area at the inlet side of the seat, the casing being provided with a port which is distinct from the outlet and inlet and is situated so that it will be closed by the valve member in its seated position.

2. A valve comprising a body having a passage therethrough and having a conical end and a collar disposed around the body, a packing ring disposed around the body adjacent the collar.

3. In combination with a casing having a bore formed as a seat and a port intermediate of the seat portion, a valve disposed in the bore and provided with a control passage and a conical head arranged in one position to cover the port and in another position to uncover the port and a collar disposed on the valve and a spring disposed on one end of the valve.

In testimony whereof I have signed my name to this specification in the presence of two subscribing witnesses.

WINFRED MATTHEWMAN.

Witnesses:
HENRY ALLIN RYN,
ROBERT MILTON SPEARPOINT.